May 24, 1949.　　　　　　　　C. LORBER　　　　　　　　2,471,223

SELF-QUIZ DEVICE

Filed June 14, 1946

Patented May 24, 1949

2,471,223

UNITED STATES PATENT OFFICE 2,471,223

SELF-QUIZ DEVICE

Charles Lorber, Louisville, Ky.

Application June 14, 1946, Serial No. 676,627

2 Claims. (Cl. 35—48)

This invention relates to educational appliances and has special reference to a knowledge testing device. More particularly this application is a continuation in part of my prior application No. 567,430 filed Dec. 9, 1944, for a Self-quizzing device, now abandoned.

One important object of the invention is to provide a knowledge testing device suitable for use in connection with magazines, newspapers and the like.

It is quite a common thing to have in a newspaper, magazine or other similar device a series of printed questions or problems. For instance, there may be a series of questions to be answered by either the word "false" or "true" on one page of a magazine. Reference is made, in connection with these questions or problems, to answers to be found on some other page of the magazine or other publication. In order to compare the answers given by the person making such answers with the true answers it becomes necessary to refer back and forth between two pages frequently separated at a considerable distance.

A second important object of the invention is to provide a knowledge testing device of this general character wherein the questions or problems may, by a lateral slipping under pressure of the fingers movement, expose answers, the answers being aligned opposite the questions or problems.

The third important object of the invention is to provide a novel means of this description whereby a person may readily test his own knowledge.

With the above and other objects in view the invention consists in general of certain novel details of construction and combinations of parts hereinafter fully described, illustrated in the accompanying drawings and particularly claimed.

In the accompanying drawings like characters of reference indicate like parts in the several views, and:

Fig. 1 is a plan showing an arrangement of the device in use in connection with a newspaper or magazine.

Fig. 2 is a bottom edge view of the arrangement shown in Fig. 1.

Fig. 3 is a bottom edge view of the arrangement shown in Fig. 1, the view being diagrammatic and illustrating two of the sheets of Fig. 1 as lying next to each other.

Fig. 4 is a diagrammatic view similar to Fig. 3 but showing what may be termed idle sheets interposed between the sheets shown in Figs. 1 and 2.

Fig. 5 is a diagrammatic view showing a wide sheet with a bulge between flat side edge portions.

It is to be understood in what follows that the word "problem" as hereinafter used refers to any proposed task which may require an answer, such answer being either given entirely in the language of the user of the device or being given by the selection of one of a plurality of indexed answers associated with the particular problem to be solved, the answer being set down by writing the index of the answer selected from the particular plurality of answers capable of being given.

In Figs. 1 to 5 the device is shown in connection with a magazine having a leaf 10 upon which the problems are indicated and an underlying leaf 11 upon which the answers are indicated. The leaves 10 and 11 are of equal width so that their lateral margins are coincident in the magazine-like structure.

As an illustration of the problems which may be used in this form of the invention the leaf 10 contains one or more rectangular spaces 12 and as herein shown such a space may contain a series of numbered problems of characters such as statements 13. These rectangular spaces are spaced inwardly from the marginal edge 15 of the leaf 10 and between this marginal edge and the rectangular spaces is arranged a series of columns, the column 16 next the spaces 12 giving the number of the problem, and the column 17 being a series of blank spaces wherein are to be inserted, by the person taking the test, indications as to whether the statements are true or false.

At the margin of the sheet 11 there is arranged a column 18 giving the numbers of the problems corresponding to those in the column 16. Next of this inwardly of the marginal edge 20 is a column 19 giving values to be allowed for correct answers to the problems on the first page. Inwardly of this column is a column 21 wherein indicia of the correct answers are disclosed.

In the use of this form of the device the user observes the respective problem as given at 13, and places in the column 17 opposite the problem whatever indication he may consider applies to the statement shown. Having filled the blanks in the column 17 the user then slips the sheet 10 laterally over the sheet 11 to expose that marginal portion shown in Fig. 1, this slipping being indicated in Figs. 3 and 4. Then it will be seen that the column 17 will be next to the column 21 so that the answers given by the user may quickly be compared with the correct answers in column 21. Then the values in column 19 may be checked off and added to give a total value of the test at the bottom of column 19.

It is to be noted in Figs. 3 and 4 that the sheet 10 may lie next the sheet 11 or may have one or more sheets 24 interposed between the sheets 10 and 11. In such case it will be obvious that the interposed sheets are slipped sideways at the same time that the sheet 10 is slipped sideways so that the columns 17 and 21 will still be exposed in juxtaposition.

It is also to be noted from Figs. 3 and 4 that, in each case, the sheet 10 has a portion 25 to be pressed firmly down by the fingers of the user's hand so as to lie flat with respect to the edge portion of the sheet 11 when the sheet 10 is drawn back to expose the column 21. Also the remainder 26 of the sheet 10 will, under these circumstances, bulge away from the sheet 11. Furthermore, the sheet 10 is preferably creased at 27 to facilitate the holding flat of the portion 25 and the bulging of the portion 26.

It is also to be noted that, in Fig. 5 the upper sheet 10 has not only the flat portion 25 for engagement by the user's fingers but also there is a flat portion 28 at the opposite side of the sheet, a bulge 29 existing between these flat portions. This arrangement with a flat portion will exist in cases wherein the periodical has a wide sheet as in a news paper.

In all cases, however, there will be a flat finger pressed portion with a bulge behind it when the device is in use.

Having thus described the invention, what is claimed is:

1. A knowledge testing device including an upper and a lower sheet joined at one lateral edge, said sheets being of substantially the same width, the upper sheet being adapted for lateral slippage relative to the lower sheet to expose a portion of said lower sheet at the free lateral edges thereof, said upper sheet having a vertical crease intermediate its lateral edges said upper sheet including a flat portion at its free lateral edge adapted to lie flat with reference to the lower sheet extending from its free lateral edges to said crease, the remainder of the upper sheet bulging upwardly away from the lower sheet when pressed laterally, the first upper sheet having a column of appropriately defined blank spaces along its marginal edge and a column of printed problems laterally alined with the blank spaces, the lower sheet having a column of indicia along its marginal edge indicating answers to said problems, the indicia being laterally alined with the blank spaces when exposed by lateral slippage of the first sheet, the lower sheet having a column of indicia along its marginal edge indicating answers to said problems.

2. A knowledge testing device including an upper and lower sheet joined at one lateral edge, said sheets being of substantially the same width, the upper sheet being adapted for lateral slippage relative to the lower sheet to expose a portion of said lower sheet at the free lateral edges thereof, said upper sheet having a vertical crease intermediate its lateral edges said upper sheet including a flat portion at its free lateral edge adapted to lie flat with reference to the lower sheet extending from its free lateral edge to said crease, the remainder of the upper sheet being adapted when pressed laterally to bulge upwardly away from the lower sheet, the upper sheet having a column of appropriately defined blank spaces along its marginal edge and a column of printed problems laterally alined with the blank spaces, the lower sheet having a column of indicia along its marginal edge indicating answers to said problems, the indicia being laterally alined with the blank spaces when exposed by lateral slippage of the first sheet, the lower sheet having a column of indicia along its marginal edge indicating answers to said problems, the said blank spaces normally interrupting the continuity between the problems and the answer indicia and completing the continuity upon the blank spaces, being filled with putative answer indicia.

CHARLES LORBER.

REFERENCES CITED

The following references are of record in the file of this patent:

UNITED STATES PATENTS

| Number | Name | Date |
| --- | --- | --- |
| 1,163,184 | Thompson | Dec. 7, 1915 |
| 1,500,777 | Stevenson | July 8, 1924 |
| 2,305,972 | Lorber | Dec. 22, 1942 |
| 2,380,657 | Lorber | July 31, 1945 |
| 2,459,231 | Lorber | Jan. 18, 1949 |

OTHER REFERENCES

Washington Times Herald for July 29, 1941, page 21.